(12) United States Patent
Kazmi et al.

(10) Patent No.: US 8,798,525 B2
(45) Date of Patent: Aug. 5, 2014

(54) COMPOSITE REPORTING OF WIRELESS RELAY POWER CAPABILITY

(75) Inventors: Muhammad Ali Kazmi, Bromma (SE); Olav Queseth, Solna (SE)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 413 days.

(21) Appl. No.: 13/384,702

(22) PCT Filed: Jun. 29, 2011

(86) PCT No.: PCT/SE2011/050862
§ 371 (c)(1),
(2), (4) Date: Jan. 18, 2012

(87) PCT Pub. No.: WO2012/064251
PCT Pub. Date: May 18, 2012

(65) Prior Publication Data
US 2012/0196528 A1  Aug. 2, 2012

Related U.S. Application Data

(60) Provisional application No. 61/411,656, filed on Nov. 9, 2010.

(51) Int. Cl.
*H04B 3/36* (2006.01)
*H04B 7/14* (2006.01)
*H04W 52/36* (2009.01)
*H04W 52/46* (2009.01)
*H04W 52/34* (2009.01)
*H04W 52/14* (2009.01)

(52) U.S. Cl.
CPC ............ *H04W 52/46* (2013.01); *H04W 52/365* (2013.01); *H04W 52/146* (2013.01); *H04W 52/143* (2013.01); *H04W 52/34* (2013.01); *H04W 52/367* (2013.01)

USPC .......... 455/7; 455/11.1; 455/67.11; 370/279; 370/315

(58) Field of Classification Search
CPC ............ H04B 2203/5479; H04B 2203/5495; H04B 3/58; Y02B 90/2653; H04L 2001/0097; H04L 45/123; H04W 40/08; H04W 24/10; H04W 72/085; H04W 28/26; H04W 36/0072; H04W 52/244; H04W 72/02; H04W 72/1231; H04W 84/047
USPC .......... 455/9, 424, 436, 11.1, 83, 232.1, 450, 455/7, 67.11, 422.1; 370/279, 315, 329
See application file for complete search history.

(56) References Cited

U.S. PATENT DOCUMENTS

| | | |
|---|---|---|
| 2006/0253736 A1 | 11/2006 | Rudolf et al. |
| 2009/0197588 A1 | 8/2009 | Khandekar et al. |
| 2009/0201874 A1 | 8/2009 | Okuda |
| 2009/0252051 A1 | 10/2009 | Yu et al. |
| 2010/0097978 A1* | 4/2010 | Palanki et al. ............... 370/315 |
| 2010/0167743 A1* | 7/2010 | Palanki et al. ............... 455/436 |
| 2011/0195708 A1* | 8/2011 | Moberg et al. ............... 455/424 |
| 2011/0243037 A1* | 10/2011 | Sundstrom et al. .......... 370/279 |
| 2012/0176958 A1* | 7/2012 | Queseth et al. ............... 370/315 |
| 2012/0184204 A1* | 7/2012 | Kazmi et al. ...................... 455/7 |
| 2012/0250605 A1* | 10/2012 | Du et al. ...................... 370/315 |
| 2013/0028224 A1* | 1/2013 | Chen et al. ................... 370/329 |
| 2013/0040558 A1* | 2/2013 | Kazmi ............................ 455/9 |
| 2013/0172000 A1* | 7/2013 | Van Phan et al. ............ 455/450 |
| 2013/0308520 A1* | 11/2013 | Damnjanovic et al. ....... 370/315 |

FOREIGN PATENT DOCUMENTS

| | | |
|---|---|---|
| CN | 101557641 A | 10/2009 |
| EP | 2200371 A2 | 6/2010 |
| WO | 2008084371 A2 | 7/2008 |

OTHER PUBLICATIONS

3rd Generation Partnership Project; Technical Specification Group TSG RAN; <Title1; Title2> (Release 10), 3GPP TR ab.cde v0.3.0, R4-103943, Oct. 2010, pp. 1-26.

3rd Generation Partnership Project; Technical Specification Group Radio Access Network; Evolved Universal Terrestrial Radio Access (E-UTRA), "Further Advancements for E-UTRA Physical Layer Aspects (Release 9)," 3GPP TR 36.814 v9.0.0, Mar. 2010, pp. 1-104.

* cited by examiner

Primary Examiner — Sujatha Sharma
(74) *Attorney, Agent, or Firm* — Coats and Bennett P.L.L.C.

(57) ABSTRACT

A relay node (800) reports its output power capability to a donor base station or other network node separately for the relay node's backhaul and access links, which may have different maximum output power. A corresponding network node (900), such as a donor base station, an Operations & Maintenance node, an Operational Support Systems node, a Self-Organizing Network node, is configured to request the relay node (800) to report its backhaul link and access link output power class capabilities or maximum output powers or rated output powers to the network node (900), and then to receive the reported capabilities in response. The report may specify a per-antenna transmit power capability; this may be specifically requested in some cases. The received relay node power-class capability information for the backhaul and access links is then used for one or several network management functions, such as radio resources management or network planning and dimensioning.

38 Claims, 5 Drawing Sheets

COMPOSITE REPORTING OF WIRELESS RELAY POWER CAPABILITY

RELATED APPLICATIONS

This application claims priority to U.S. Provisional Patent Application Ser. No. 61/411,656, filed 9 Nov. 2010, the entire contents of which are incorporated by reference herein.

FIELD OF THE INVENTION

The present invention relates generally to the management of relay nodes in wireless communication networks, and more particularly relates to techniques for reporting power capabilities for relay nodes to facilitate wireless network resource management.

BACKGROUND

A relay node (RN) is used to receive and re-transmit/forward signals intended for user equipments (UEs) in a mobile network. A number of UEs can be served by a relay. The primary objective of the relay node is to enhance the coverage in the uplink and downlink.

In the Long-Term Evolution (LTE) specifications developed by the $3^{rd}$-Generation Partnership Project (3GPP), the relay architecture comprises a RN connected wirelessly to a "donor cell," which is served by a "donor base station (known as a donor eNode B, or DeNB, in 3GPP terminology). The wireless connection between the RN and the DeNB is referred to as the radio backhaul link. UEs connect to the RN via a radio access link that is identical (at least from the UE's perspective) to the radio access link used by UEs to access a conventional eNB.

In LTE, the backhaul link (DeNB-RN link) and access link (RN-UE link) are termed as the Un and Uu interfaces respectively. The connection between different nodes when RN is used is shown on FIG. 1. In FIG. 1, UE 110 is connected to RN 120 via the Uu interface, while RN 120 is connected to eNB 130 (the donor eNode B) via the Un interface, eNB 130 is connected to the Evolved Packet Core (EPC) 140 using the standard interfaces developed by 3GPP.

In practice, the RN may be fixed or movable. Both of these types of RN are wireless RN in that they receive and transmit wireless signals over the access and backhaul links. A "fixed" RN is stationary or immovable. For simplicity, the generic term RN or relay is used throughout this document. In some cases, a movable RN may be implemented as a standalone mobile relay, i.e., as a wireless device dedicated to operation as an RN. In other cases, a wireless terminal that is capable of providing end-user services, whether to a user or to a machine, such as in a machine-to-machine context, may also act as a relay. In some cases, a mobile relay may be deployed in a moving vehicle such as a bus, train, ferry, or the like, in which case it may primarily serve UEs that are aboard the movable vehicle. However, a moving mobile relay may also serve UEs in surrounding areas.

The illustration in FIG. 1 depicts a single hop relay architecture, the details of which are currently being specified by 3GPP for LTE networks. Currently, LTE does not specify multi-hop capability for relays. However, one extension of the relay technique is to deploy multiple relay nodes between the served UE and the eNB. Multi-hop relays are well known in other communications contexts. Information sent to the UE from the fixed network "hops" from the donor base station through multiple RNs, until it reaches the UE. In a similar manner information sent from the UE traverses multiple RN on the way to the donor base station. It should be noted that a multi-hop relay system may comprise any or several of the various types of relays discussed above, including fixed relays, movable relays or a combination of fixed and movable relays. For example, in a two-hop relay deployment scenario, a fixed relay might be used for the first hop while a movable relay is the used for the second hop, or vice-versa.

FIG. 2 illustrates the multi-hop relay concept based on two hops, as it might appear in an LTE network. In the example system illustrated in FIG. 2, UE 110 communicates with RN 210, over the Uu interface. RN 210 in turn communicates with RN 220, which finally communicates with DeNB 130, over the Un interface.

A single- or multi-hop relay system can be employed in any system, e.g., a High-Speed Packet Access (HSPA) network (i.e., UTRA FDD and UTRA TDD), GSM (including GERAN/EDGE), 3GPP2 CDMA technologies (e.g., CDMA2000 and HRPD) or a multi-radio-access-technology (multi-RAT) carrier aggregation (CA) system such as HSPA-LTE CA, etc.

Relay architectures similar to those shown in FIGS. 1 and 2 may also be employed in other technologies such as in HSPA FDD/TDD, GSM/GERAN, CDMA2000/HRPD, WiMax etc. However the relay architecture may be slightly different in other technologies. In general, a RN is connected via backhaul link to any type of donor base station (e.g., belonging to HSPA, GSM, CDMA200, WiMax technology etc). For example, FIG. 3 illustrates a possible relay architecture for an HSPA network. In this figure, a UE 310 is connected to an RN 320 that supports HSPA services. RN 320 is connected to the Node B 330, which in turn is connected to a radio network controller (RNC) 340, via the Iub interface.

SUMMARY

A relay node may be designed to have different maximum output power capabilities for the access and backhaul links. A relay node's maximum output power in each of the backhaul and access links may depend on several factors, such as the selected frequency/frequency band for each of the access and backhaul links, typical operating temperature, available power sources, local emission requirements, and so on.

In several embodiments of the techniques and apparatus described in detail below, a relay node reports its output power capability to the donor base station or other network nodes separately for the backhaul and access links, which may have different maximum output power. More specifically, a network node, such as a donor base station, an Operations & Maintenance (O&M) node, an Operational Support Systems (OSS) node, a Self-Organizing Network (SON) node, or the like, may be configured to request the relay node to report its backhaul link and access link output power class capabilities or maximum output powers or rated output powers to the network node, and then to receive the reported capabilities in response. In some cases the report may specify a per-antenna transmit power capability; this may be specifically requested in some cases. The received relay node power-class capability information for the backhaul and access links may then be used for one or several network management functions, such as radio resources management (e.g., admission control of users in access link), network planning/dimensioning, etc.

Likewise, a relay node may be configured to report its backhaul link and access link output power class capabilities or maximum output powers or rated output powers to a network node, such as a donor base station, an O&M node, an OSS node, a SON node, etc. Again, this report may indicate per-antenna port capabilities, rather than (or in addition to) total output power capabilities. In some cases, this reporting may be in response to request; in others, the report may be responsive to an attachment to the network or some other triggering event.

Relay node and base station node apparatus corresponding generally to the methods summarized above are also disclosed, and include processing circuits configured to carry out one or more of the techniques described herein for signaling and processing reference signal identification information. Of course, those skilled in the art will appreciate that the present invention is not limited to the features, advantages, contexts or examples summarized above, and will recognize additional features and advantages upon reading the following detailed description and upon viewing the accompanying drawings.

DETAILED DESCRIPTION

Figure 1:
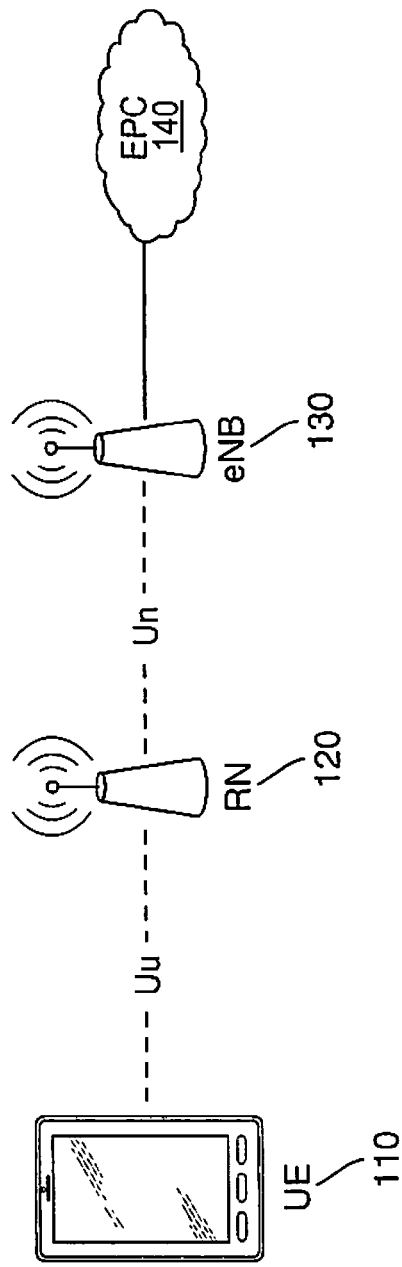
FIG. 1 illustrates the components of a single-hop relay node architecture in an LTE network.

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP LTE-Advanced has been used in this disclosure to exemplify the invention, this should not be seen as limiting the scope of the invention to only the aforementioned system. Other wireless systems including or adapted to include multi-layer transmission techniques may also benefit from exploiting the ideas covered within this disclosure.

Also note that terminology such as eNB and UE should be considered in their broadest senses as applied to the principles of the invention. In particular, while detailed proposals applicable to LTE are described here, the described techniques may be applied to other wireless networks, of various topologies and radio technologies. Accordingly, the term "user equipment" or "UE" should be interpreted broadly, to include various types of radio access equipment (radio devices used to access a wireless network) including cell phones, fixed wireless terminals, wireless adapters for use with portable computers, wireless access devices built into or intended for use with laptop computers, tablet computers, and the like, as well as wireless access devices used in so-called machine-to-machine (M2M) applications. Likewise, while the discussion that follows may use the terms evolved NodeB, Node B, DeNB, and the like, those terms should be understood broadly to apply to any base station or other wireless network access point configured according to the inventive techniques.

The operation of a wireless relay node can be classified into two categories with respect to usage of the radio spectrum. The first category is the "in-band relay." in this case, the backhaul link and the access link operate using the same carrier frequency. Typically, the communication over the backhaul and access links are time-domain multiplexed. However, in principle simultaneous operation over the two links may also be possible provided sufficient isolation between the access and backhaul links are achieved, e.g., by the virtue of directive transmission, or by introducing another multiplexing technique such as code-division multiplexing. The second category is the "out-of-band" or "out-band relay." In this case, the backhaul link and the access link operate using different carrier frequencies, i.e., the backhaul and the access link are separated in the frequency domain. The carrier frequencies may belong to the same general radio frequency band, or to completely different frequency bands.

A concept called carrier aggregation (CA) is being introduced in 3GPP wireless networks, and is used to aggregate two or more component carriers for supporting high data rate transmissions over a wide bandwidth. For instance, CA in LTE is expected to provide up to 100 MHz of bandwidth to a single UE. CA may be used in the radio downlink, uplink, or in both directions. Carrier aggregation technology is also called (e.g., interchangeably called) "multi-carrier systems", "multi-carrier operation", and/or "multi-carrier" transmission and/or reception.

Often, the component carriers in carrier aggregation belong to the same technology (e.g., all are either WCDMA LTE). However, carrier aggregation between carriers of different technologies may also be used to increase data throughput. For example, the carriers from WCDMA and LTE may be aggregated. Another example is the aggregation of LTE and CDMA2000 carriers. Carrier aggregation between carriers of different technologies is also referred to as "multi-RAT carrier aggregation" or "multi-RAT-multi-carrier system" or simply "inter-RAT carrier aggregation". For the sake of clarity, carrier aggregation within the same technology may be regarded as 'intra-RAT' or simply 'single RAT' carrier aggregation.

There are two general cases or types of carrier aggregation. A first general case is continuous carrier aggregation; a second general case is non-continuous carrier aggregation. In continuous carrier aggregation, the available component carriers are adjacent to each other, e.g., adjacent to one another in the same frequency band. In non-continuous carrier aggregation the aggregated component carriers are separated along the frequency band.

In both cases, multiple component carriers are aggregated to serve a single user equipment unit (UE). According to existing spectrum allocation policies and the fact that the spectrum resource in the low frequency bands is scarce, it is difficult to allocate continuous 100 MHz bandwidth for a mobile network. Therefore, the non-continuous carrier aggregation technique provides a practical approach to enable mobile network operators to fully utilize their (often scattered) spectrum resources. Non-continuous carrier aggregation deployments are typically further categorized as (1) multiple (non-contiguous) component carriers that are separated such that they belong to different frequency bands, and (2) multiple (non-contiguous) component carriers that are within the same frequency band.

Yet a third carrier aggregation category is also possible: a hybrid of contiguous and non-contiguous carriers. For example, a hybrid CA deployment may include two or more adjacent carriers in one frequency band (e.g., band A) and one or more contiguous or non-contiguous carriers in another frequency band (e.g., band B).

CA may also be used in relay environment to increase the data rate over the backhaul and/or access links. Furthermore, carrier aggregation may be used in both in-band and out-band relays.

Often, more than one relay node is connected to the same donor base station. The relays are generally deployed in the coverage area of the donor cell. Since the primary function of relay node is for coverage improvement, both outdoor and indoor relay deployment scenarios are beneficial under various circumstances. For instance, an outdoor relay can be used for improvement of cell edge coverage. The indoor relay, on the other hand, might be used for addressing indoor dead spots, or serving indoor hot spots.

Furthermore, whether the relay is deployed outdoors or indoors, the antennas used for the backhaul and access links may either be in the indoors or outdoors. In other words, any combination of indoor/outdoor antennas and indoor/outdoor relay is possible in principle. In addition, the same or different MIMO configurations may be used in the access link and the backhaul link. Thus, for example, a relay may use two transmit and two receive antennas for the access link, and four transmit and four receive antennas on the backhaul link.

Figure 4A:
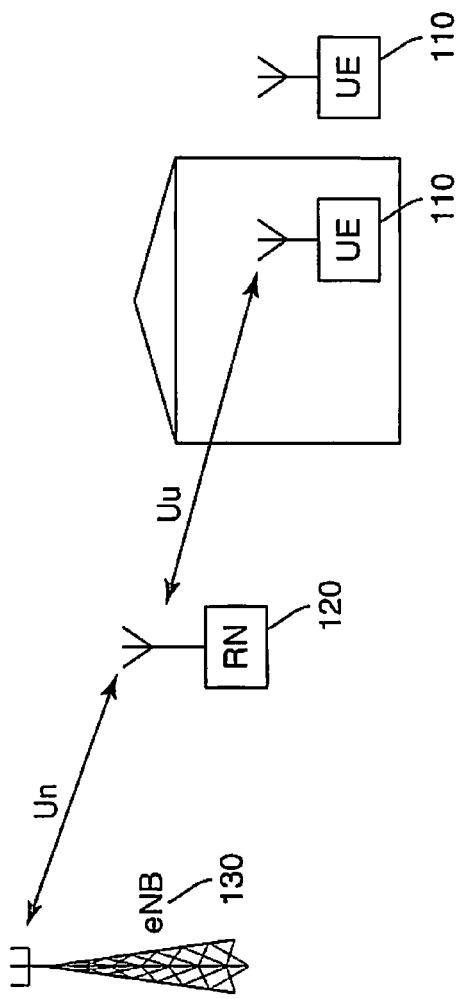
FIGS. 4A, 4B, and 4C illustrate example deployment scenarios for relay nodes.
Figures 4B, 4C:
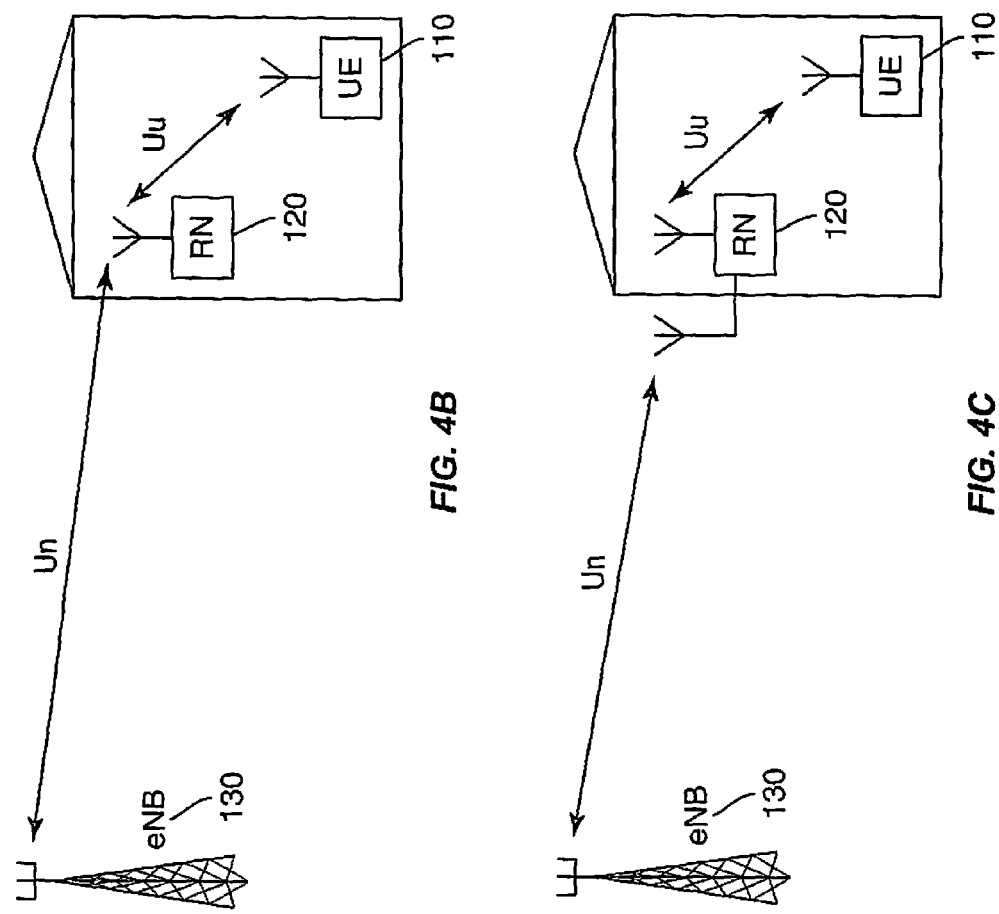

Examples of three relay deployment scenarios are illustrated in FIGS. 4A-4C. In FIG. 4A, the relay 120 is deployed outdoors; all the relay antennas for the transmission and reception of signals over the backhaul and access links are also located in the outdoors. The outdoor relay 120 serves outdoor and indoor users. In FIG. 4B, the relay 120 is deployed indoors; all the relay antennas for the transmission and reception of signals over the backhaul and access links are also located in the indoors. The indoor relay 120 primarily serves indoor users. Finally, in FIG. 4C, the relay 120 is deployed indoors. The relay antennas for the transmission and reception of signals over the backhaul link are located outdoor. However the antennas for the access link are located indoors. This type of relay deployment is also called a Truwall (through wall, or thru-wall), and is usually meant to primarily serve the indoor users. The use of outdoor backhaul antennas results in improved backhaul link quality, e.g., compared to pure indoor deployment. It should be noted that deployment scenarios are not limited to the three scenarios illustrated in FIGS. 4A-4C. Further, multiple antennas may be used for receive and/or transmit operations on either or both of the access and backhaul links; still further, the number of antennas used for transmit and receive transmits may differ in any given relay 120, as may the number of antennas used for the access link and the backhaul link.

A relay node may also be a multi-standard radio (MSR). A MSR relay contains common radio frequency (RF) components (e.g., power amplifiers, RF filters) which can be used selectively to operate simultaneously with more than one RAT or using more than one carrier within the same RAT. The MSR relay may also be termed a multi-carrier, multi-standard radio (MC-MSR) base station, due to the fact that it may sometimes support a single RAT, with more than one carrier.

Hence, a single-RAT MSR is a special case of the MSR. A single-RAT MSR relay may support one or more carriers of the same RAT. Hence, another special case of a MSR relay is a relay that supports a single carrier within a RAT, i.e., single-carrier, single-RAT MSR relay. Similarly, a multi-carrier single-RAT MSR relay supports more than one carrier of the same RAT. A single-RAT MSR relay may differ from a conventional (non-MSR) single-RAT relay due to differences in some of the radio requirements. The MSR node has generic radio requirements. The MSR relay may support frequency-division duplexing (FDD) or time-division duplexing (TDD). Examples of RATs that might be supported in a FDD MSR relay are: LTE FDD, UTRA FDD and GSM. Another example is: LTE FDD and 3GPP2 CDMA technologies (e.g., CDMA200 and HRPD). Examples of RATs that might be supported in a TDD MSR relay are: LTE TDD and UTRA TDD.

The carriers within a FDD or TDD MSR relay may be contiguous or non-contiguous. Furthermore such relay may be used in single hop or in multiple hop relay system. It will be appreciated that all of the techniques disclosed herein for managing relay nodes in wireless networks apply to relays of any of the types discussed above, including relay nodes that are based on the MSR principle.

Given the many different possible deployment scenarios for a relay node, some of which are described above, the relays may be designed to have different maximum output power in the access part from the maximum output power for the backhaul part. This means the available maximum output power can be different on the access and backhaul links.

A relay node's maximum output power in each of the backhaul and access links may also depend upon additional factors (i.e., beyond the deployment scenario/environment) such as the selected frequency/frequency band for each of the access and backhaul links, typical operating temperature, available power sources (connected to wall, backup batteries, generator etc.), local emission requirements (e.g., regulatory and/or safety limitations), etc.

In the past it has been assumed that a relay node's maximum output power for transmitting over the access link and the backhaul link is the same. For example, the maximum output power of 30 dBm is assumed for backhaul and access link transmission. When the maximum output power (i.e., the power class) is the same for both links, then no explicit signaling to indicate the power class for each link is necessary. However, if the relay node's maximum output powers differ for the backhaul and access links, the lack of such information in the network (e.g., at the donor base station) may lead to inefficient relay operation. For instance, it may lead to over-allocation or underutilization of resources in the backhaul and access links.

Thus, one concept behind several of the techniques discussed below is that a relay node reports its output power capability to the donor base station (or other relevant network nodes) separately for the backhaul and access links, which may have different maximum output power. More specifically, a network node, such as a donor base station, an Operations & Maintenance (O&M) node, an Operational Support Systems (OSS) node, a Self-Organizing Network (SON) node, or the like, may be configured to request the relay node to report its backhaul link and access link output power class capabilities or maximum output powers or rated output powers to the network node, and then to receive the reported capabilities in response. In some cases the report may specify a per-antenna transmit power capability; this may be specifically requested in some cases. The received relay node power-class capability information for the backhaul and access links may then be used for one or several network management functions, such as radio resources management (e.g., admission control of users in access link), network planning/dimensioning, etc.

Likewise, a relay node may be configured to report its backhaul link and access link output power class capabilities or maximum output powers or rated output powers to a network node, such as a donor base station, an O&M node, an OSS node, a SON node, etc. Again, this report may indicate per-antenna port capabilities, rather than (or in addition to) total output power capabilities. In some cases, this reporting may be in response to request; in others, the report may be responsive to an attachment to the network or some other triggering event.

The techniques described herein are applicable to single-hop as well as multi-hop relays. In a multi-hop system, the end relay may report its output power capability (access link, backhaul links) to the donor node via intermediate relay either transparently, such that the intermediate relay is unaware of the reports, or non-transparently, such that the intermediate relay node is aware of the reports.

As noted above, one concept behind the techniques described herein is that the relay node is able to report its output power capability to the donor base station (or other relevant network nodes) separately for backhaul and access links, as these links may have different maximum output power capabilities. It is also possible that a given relay node has different lowest or minimum output power capabilities for the access and backhaul links. For the purposes of discussion, these parameters are denoted as follows:

relay node's backhaul link maximum output power=$P_{MAX\_BL}$ relay node's access link maximum output power=$P_{MAX\_AL}$ relay node's backhaul link minimum output power by: $P_{MIN\_BL}$ relay node's access link minimum output power by: $P_{MIN\_BL}$.

There are several ways in which the relay output power capability can be reported. For instance, the relay node may simply report the absolute value of its maximum output power capability for the backhaul link and access link to the network nodes. For example the relay node supporting $P_{MAX\_BL}$=30 dBm and $P_{MAX\_AL}$=24 dBm (for the backhaul and access links respectively) may simply report each of these absolute values to the network node, using any appropriate coding or digital representation for each value. Similarly, the relay node may also report the absolute values of the minimum output power (e.g., $P_{MIN\_BL}$=−50 dBm and $P_{MIN\_AL}$=−40 dBm) to the network node.

Another approach is relative power reporting. The objective of this approach is to reduce the signaling overhead compared to the absolute power reporting approach. According to this technique, the relay node reports to the network node the absolute value of its maximum output power capability for one link (which can be either the backhaul link or the access link, provided only that the network node receiving the report is aware of the order) and a relative power metric for the second link, where the relative power metric indicates the relative power capability of the second link with respect to the power capability of the first link.

For example, using the above principle, the relay node supporting Pmax_BL=30 dBm and Pmax_AL=24 dBm (i.e., for the backhaul and access links respectively) reports Pmax_BL=30 dBm (absolute) and ΔPmax_AL=−6 dB (relative to the backhaul link power) to the network node. Alternatively the relay node with the above maximum output power capability may report ΔPmax_BL=6 dB (relative to the access link power) and Pmax_AL=24 dBm (absolute) to the network node.

Similarly, the relay node might also be configured to report the absolute and relative values of the minimum output power for the first and second links respectively, e.g., Pmin_BL=−50 dBm (absolute min power) and Pmin_AL=10 dB (relative to the backhaul min power) or vice-versa, to the network nodes.

According to still another approach, the relay node may report its power capability for the backhaul and access links with respect to a pre-defined reference value (PREF). The reference value may be different for the maximum output power (Pmax_REF) and minimum output power (Pmax_REF). Furthermore the reference value may also be different for the backhaul (Pmax_REF_BL/Pmin_REF_BL) and access links (Pmax_REF_AL/Pmin_REF_AL). In one variant of this approach, the reference values may correspond to the maximum and minimum output powers of the donor base stations (e.g., the donor eNode B in LTE).

Another approach to reporting power capabilities is to report a scenario identifier that represents a particular combination of output power capabilities, rather than individually reporting the capabilities. An objective of this approach to reporting is to reduce the signaling overheads compared to the relative and absolute power reporting methods. In this case pre-defined tables defining the backhaul and access links power capability, relative to a set of scenario identifiers, can be defined in a standard, or are otherwise known to both the relay node and the network node that receives the report.

A few examples of such pre-defined tables are shown below, Table 1 illustrates one way of pre-defining the relay output power capability in a standard. The relay supporting a particular capability can report the identifier corresponding to its capability to the network nodes. The table can be updated in case a relay node with new power class is standardized. This means few extra bits should be reserved for the future scenarios, e.g., 4 bits for Table 1 rather than 2 bits assuming 12 additional scenarios may be added in future releases.

TABLE 1

Example of relay maximum output power scenarios

| Scenario ID | Relay maximum output power [dBm] | |
| --- | --- | --- |
| | Backhaul link | Access link |
| 1 | 24 | 24 |
| 2 | 30 | 30 |
| 3 | 24 | 30 |
| 4 | 30 | 24 |

Table 2 shows another method of pre-defining its output power capability in the standard. The difference is that the relay power class in terms of its deployment scenario (e.g., indoor) is defined. The relay supporting a particular capability can report the identifier corresponding to its capability to the network nodes. The table can also be updated in case a relay node with new power class/deployment type is standardized. Hence few extra bits should be reserved for the future scenarios, e.g., four bits rather than three bits, assuming that up to ten additional scenarios may be added in future releases.

TABLE 2

Example of relay maximum output power

| | | Relay maximum output power [dBm] | |
|---|---|---|---|
| Scenario ID | Relay type | Backhaul link | Access link |
| 1 | Outdoor # 1 | 30 | 30 |
| 2 | Outdoor # 2 | 30 | 24 |
| 3 | Indoor # 1 | 30 | 24 |
| 4 | Indoor # 2 | 30 | 20 |
| 5 | Truwall # 1 | 24 | 24 |
| 6 | Truwall # 2 | 24 | 20 |

Pre-defined tables, similar to those illustrated in Tables 1 and 2 but containing the minimum output power for backhaul and access links along with their scenario identifiers, can also be standardized. Using such a pre-defined table, a relay may be configured to report a separate identifier corresponding to its minimum output power capability.

In the reporting approaches discussed above, the relay node reports its total maximum and/or minimum output power capability for the backhaul and the access links. However, a relay node may also support multi-antenna transmission techniques, such as transmit diversity, MIMO, etc. Thus, in some embodiments a relay node may also (or instead) report its maximum and/or minimum output power capabilities on a per-antenna-port basis, for one or both of the backhaul link and the access links. The relay node may use any of the principles for reporting per antenna output power capability outlined above, such as relative power reporting and/or the use of scenario identifiers.

In still other embodiments, a relay node may be configured to report its total and/or per-antenna maximum and/or minimum output power capabilities for the backhaul and the access links for each carrier or component carrier in carrier aggregation (which may be intra-RAT or inter-RAT CA). The relay node may support carrier aggregation or may employ multiple carriers for different links (i.e., which are not used for carrier aggregation). Different carriers on the same type of link (e.g., on backhaul link) may support different maximum output power, e.g., different power depending upon the frequency band or depending on the radio access technology. Hence the relay node reports maximum/minimum total and/or per antenna port power capability for each supported carrier. In the event that the output power for all carriers is the same, then a relay node may report the output power of one of the carriers (e.g., power of primary or anchor carrier in CA) and one bit indicating that all other carriers have the same output power capability. The set of signaled information can be specific to each of the backhaul and access links. Furthermore, a separate set of information can be signaled for each of the maximum and minimum output power capabilities, for each type of link (i.e., for the backhaul and access links).

As will be discussed in further detail below, any of the relay nodes described above may be pre-configured to automatically report its power capabilities, for example, in response to certain triggering events such as attachment to the donor node, a re-start of the relay node, etc. Alternatively, or in addition to such autonomous reporting, a suitable network node may configure or request the relay node to report its output power capability for the backhaul and access links.

Examples of the network nodes that might send configuration information or a request to the relay node are a base station (particularly the donor base station), such as an eNode B in LTE or a Node B in HSPA, a network controller, such as the Radio Network Controller (RNC) in HSPA or a base station controller (BSC) in GSM, a self organizing network (SON) node, an operation and management node, a core network node, such as the Mobility Management Entity in LTE, or even a positioning node, such as the evolved Serving Mobile Location Center (E-SMLC) in LTE, and so on.

The network node may request the relay to report its power capability either during an initial setup (i.e., when a new relay node is added) or when the relay node output power capability of the existing relay node is modified (e.g., upgraded or downgraded). The network node may also request the relay node to report its power capability at any other time, such as whenever it suspects the relay node capability has been modified or when configuration information has been lost.

The network node may also specify the specific principles (as described) to be used by the relay for reporting its power capability, such as whether the relay node should report its capabilities in absolute power terms, relative power terms, etc. The network node may also explicitly request whether the relay reports all of its power capability information or only specific information, such as total power or power per antenna port, for one or both of the backhaul and access links, etc. Alternatively the relay may use pre-defined rules to report the power capability and all information as specified in pre-defined rules. The relay may be pre-programmed with these pre-defined rules, or the pre-defined rules may be sent to the relay node in the field, by a network node, for subsequent use.

As described above, there is a wide range of flexibility in how the relay node is configured, and in particular with respect to which network node configures the relay node and which relay node receives and uses the reported capability information. Of course, the simplest scenario is that the donor base station (e.g., donor eNB in LTE) configures the relay node, which in turn reports its output power capability to the donor BS over the backhaul link (e.g., over the Un interface in LTE). However, other configurations are possible.

As discussed earlier, a relay node may use any of the principles outlined above to report its output power capability to a suitable network node. As noted above, this reporting may be autonomous, in some cases, or may be in response to explicit requests. Thus, some of the circumstances under which a relay node may be configured to report its output power capabilities to the network node include, but are not limited to:

The relay node reports its output capability to the network nodes upon receiving an explicit request from the network. In some cases, the nodes to receive the power capability information are specified by the requesting node. The relay node may receive requests from multiple nodes, such as the donor base station, an O&M or SON node, etc.

Some relay nodes may be configured to report output power capabilities to the network nodes upon initial setup or after the connection re-establishment, e.g., upon recovering from radio link failure, even if there is no explicit request from the network.

Some relay nodes may be configured to report output power capabilities to the network nodes each time the relay node is modified, e.g., more carriers or antennas are added, power capability is modified etc., even if there is no explicit request from the network.

The various embodiments described above enable a given network node (e.g., the donor base station) to acquire the maximum/minimum output power capabilities of the relay node, for each or both of the backhaul and access links. This acquired relay output power capability information may also be signaled to other network nodes. For example, assume that the donor base station acquires the relay power capability information from the relay node. The donor base station may signal this information to one or more other nodes, such as another BS (e.g., to another eNodeB, over the X2 interface in LTE), another relay node, an O&M node, a SON node, a core network node (e.g., MME in LTE), or a positioning node (e.g., E-SMLC in LTE or SAS node in HSPA).

Some scenarios under which the relay node power capability information between the network nodes may be sent by the source node to the target node include, but are not limited to the following. In these scenarios, the source node represents any network node that receives the relay output power capability information:

- Power capability information is sent by the source to the target nodes upon explicit request from the target node.
- Power capability information is sent by the source node to other potential target nodes proactively (whether periodically or aperiodically).
- Power capability information is sent by the source node to other potential target nodes whenever the received relay output power capability information is modified.
- Power capability information is sent by the source node to other potential target nodes whenever new relay output power capability information is received by the source node.

The acquired relay output power capability information for the backhaul and the access links can be used by various network nodes for several different purposes, such as radio network management (such as for resource allocation, load balancing, admission control, etc.), network/cell planning or dimensioning, etc.

For example, the donor base station (e.g., a donor eNB in LTE) can use the relay access link power output capability information for determining the number of users that can potentially be admitted in the access part. The donor base station may also use this information to perform load balancing, i.e., in distributing users among several different relay nodes. The donor base station may also determine the coverage of the relay and may further use this information to determine the number of relay nodes required to cover the donor base station's coverage area.

The donor base station may use the backhaul output power capability in determining the amount of data that can be transmitted by the relay over the backhaul link. The donor base station may assign the relay to use appropriate antenna modes, modulation and coding schemes or format for transmission over the backhaul link, based on the reported power capabilities.

SON and O&M nodes may further use the relay power capability in dimensioning the suitable number of relay nodes required in the given environment. Positioning nodes, such as a positioning node in LTE (known as the Evolved Serving Mobile Location Center, or E-SMLC), may use the relay access link output power capability to determine the power of the positioning reference signals (PRS) that are used by the UE for performing positioning measurements, such as Reference Signal Time Difference (RSTD) measurements.

Figure 2:
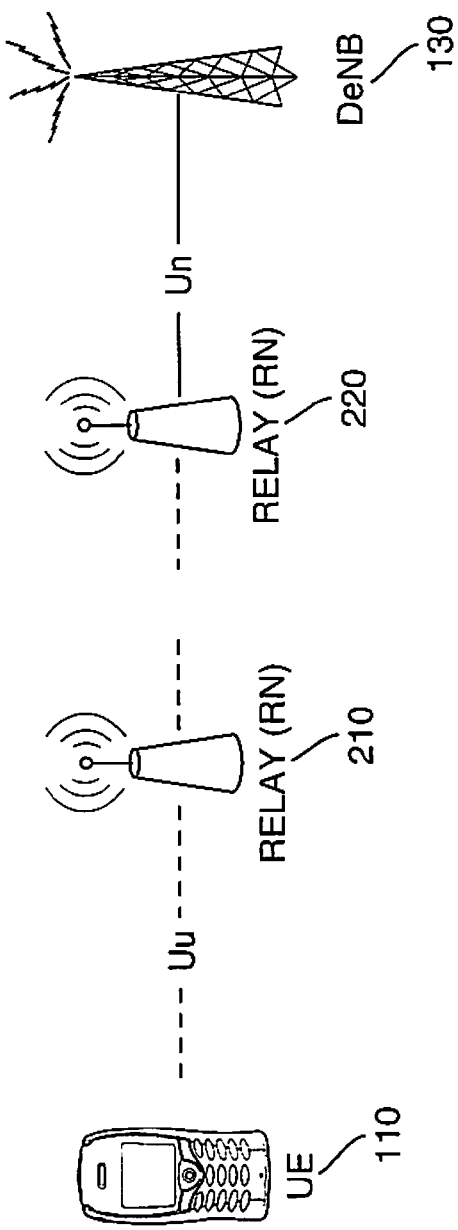
FIG. 2 illustrates components of a dual-hop relay node architecture in an LTE network.
Figure 3:
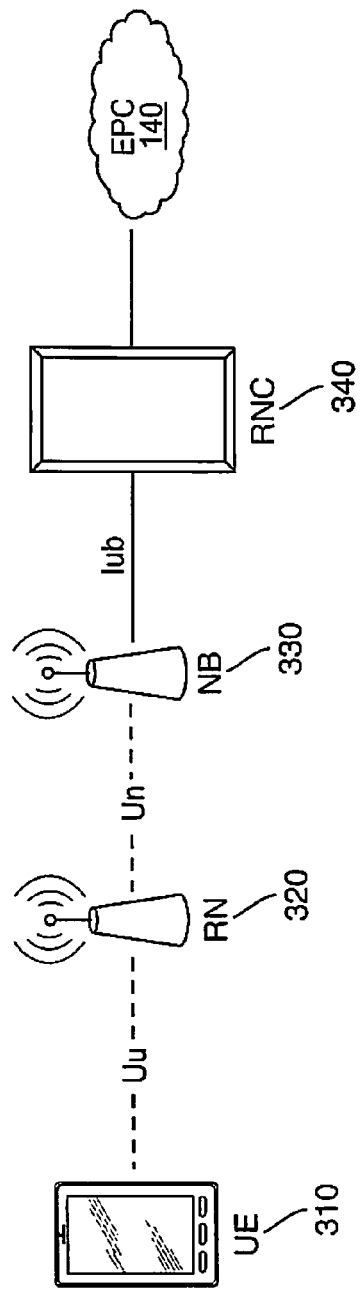
FIG. 3 illustrates components of a relay node architecture in an HSPA network.

The discussion above focused primarily on single hop relay systems, where the relay node is directly connected to the donor. However, all of the techniques and system configurations described above may also be applied to a relay system comprising of multiple hops, such as the system illustrated in FIG. 2.

In such a system, the donor base station may request the end relay (e.g., relay node 210 in FIG. 2) as well as the intermediate relay (e.g., relay node 220 in FIG. 2) to report their output power capability for each link, i.e., their respective access links and backhaul links. Of course, there may be more than one intermediate relay node, and any given intermediate relay node may even be connected to more than one end relay and/or to more than one other intermediate relays.

In various systems, an end relay node can be configured by the donor node to report its output power capabilities (for backhaul and access link) either transparently, such that the intermediate relay is not aware of the request, or non-transparently, such that the intermediate node is aware of the request. In addition, or alternatively, the intermediate relay nodes may also request the end relay to report its output power capabilities. Furthermore, the donor node may also separately lower the max output power of the access and backhaul links. As discussed above, the end relay output power capabilities may also be reported to other network nodes, e.g., to other base stations, positioning nodes, etc., as described above.

An intermediate relay node may have multiple links to other relays. The intermediate relay may also be serving users, i.e., it may have an access link for use by mobile stations. The intermediate relay may also be a standalone or dedicated node acting only as a relay. In that case, it may have only backhaul links.

The intermediate relay may have different maximum output power capabilities for different links: backhaul links and access link. Alternatively the max output power on some of the links may be the same, e.g., the same maximum output power of the access link and backhaul link between end relay and intermediate relay, while the other backhaul link, i.e., between relay and donor node, may have a different maximum output power. A few examples of different combination of relay output power classes over different links are illustrated in tables 3, 4 and 5.

TABLE 3

Relay maximum output powers (dBm) in multi-hop -
same max power levels in access link and hop#1

| | Relay maximum output power [dBm] | | |
|---|---|---|---|
| Scenario ID | Backhaul link (RN1-RN2) - hop#1 | Backhaul link (RN2-DeNB) - hop#2 | Access link |
| 1 | 24 | 24 | 24 |
| 2 | 30 | 30 | 30 |
| 3 | 30 | 24 | 30 |
| 4 | 24 | 30 | 24 |

TABLE 4

Relay maximum output powers (dBm) in multi-hop -
same max power levels in hop#2 and hop#1

| | Relay maximum output power [dBm] | | |
|---|---|---|---|
| Scenario ID | Backhaul link (RN1-RN2) - hop#1 | Backhaul link (RN2-DeNB) - hop#2 | Access link |
| 1 | 24 | 24 | 24 |
| 2 | 30 | 30 | 30 |
| 3 | 24 | 24 | 30 |
| 4 | 30 | 30 | 24 |

TABLE 5

Relay maximum output powers (dBm) in multi-hop - different max power levels in all links

| Scenario ID | Relay maximum output power [dBm] | | |
|---|---|---|---|
| | Backhaul link (RN1-RN2) - hop#1 | Backhaul link (RN2-DeNB) - hop#2 | Access link |
| 1 | 24 | 24 | 24 |
| 2 | 30 | 30 | 30 |
| 3 | 24 | 24 | 30 |
| 4 | 30 | 30 | 24 |

In systems like those summarized in the preceding tables, the intermediate relay node may be configured to report its maximum (and/or minimum) output power for each link, such as for each backhaul link and access link, to the donor node or to another relay node, such as a relay node that is acting as a donor node to the intermediate node. The reporting of output power capability information to the donor node or other relay node can be done transparently, i.e., such that other intermediate nodes or relays are not aware of the reports, or non-transparently. Furthermore, the reporting of the output power capabilities per link may take place in response to a request received from other nodes, e.g., donor node, other relays or other network nodes (e.g., positioning node etc). Alternatively, the reporting of the maximum output power per link may be sent by the intermediate relay to other nodes proactively, i.e., without receiving any explicit request, such as at the time of setup, reconfiguration, modification of one or more parameters. The intermediate relay node may use any of the principles described in previous sections to report its output power capabilities to the donor node or to other relays or to other nodes.

In systems having an intermediate relay node, the donor node may also be able to lower the maximum output power of the intermediate relay node for each link below the maximum output power capability separately, for example, in the event that the load/traffic is small or the cell size is small.

The techniques may also be used for the reporting of other types of relay capabilities for the backhaul and the access links. Examples of these additional relay capabilities include, multi-antenna capabilities, uplink and/or downlink bandwidths, a supported number of resource blocks in the uplink and/or downlink, and so on. Many of these additional capabilities may differ for the backhaul and access links, and thus the reporting scheme for the separate capabilities to be reported. Examples of a multi-antenna capability include the number of supported antennas, supported MIMO/antenna modes (e.g., transmit diversity or spatial time diversity etc), etc. Reporting of additional capabilities may also include whether or not the relay supports carrier aggregation on the backhaul and access links. In the event that it supports carrier aggregation, then the relay may also indicate additional carrier aggregation capability information for backhaul and access links, such as whether the carrier aggregation is intra-RAT, inter-RAT, contiguous or non-contiguous, whether the carrier aggregation is in the uplink or downlink or both, and so on.

In some systems, the donor node, using higher layer signaling, may independently configure the relay's maximum output power below its maximum output power capability, separately on the backhaul and access links. For example, assume that the relay supports 24 dBm maximum output power over the backhaul link and 30 dBm maximum output power over the access link. In a particular system, the donor node may be configured so that it can send instructions to the relay node to lower the maximum output powers of the backhaul and access links to 10 dBm and 20 dBm, respectively.

It should be noted that the techniques described herein are applicable to any type of RAT (LTE, HSPA, GSM, CDMA2000, HRPD, Wimax etc), and are also application to a relay node supporting a mixture of RATs (e.g., a mufti-standard radio relay). Furthermore, the MSR or non-MSR relay may support contiguous carriers or non-contiguous carriers. The techniques are also applicable to relays that support carrier aggregation or multi-carrier operation or multi-carrier-multi-RAT operation. The techniques are also applicable to wireless relays, e.g., mobile relays, which are typically deployed in the movable vehicle to mainly serve users in the vehicle or a wireless terminal acting as a relay etc.

Figure 5:
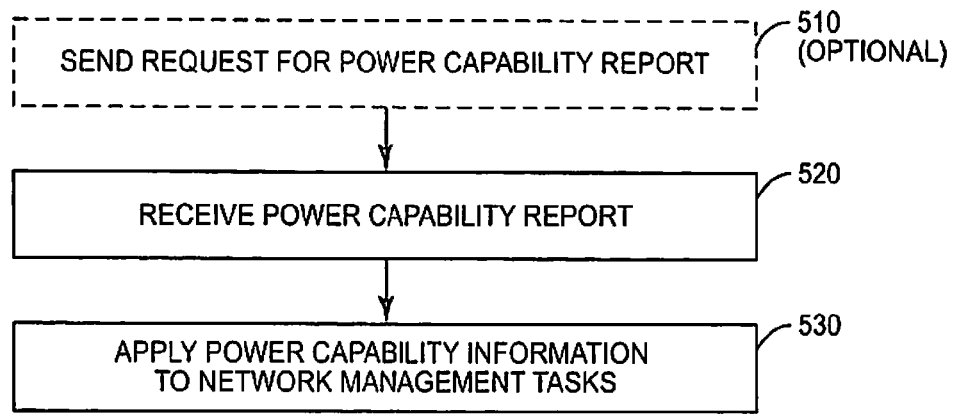
FIG. 5 is a process flow diagram illustrating a method for managing network nodes in a wireless communication network that includes a wireless relay node.
Figure 6:
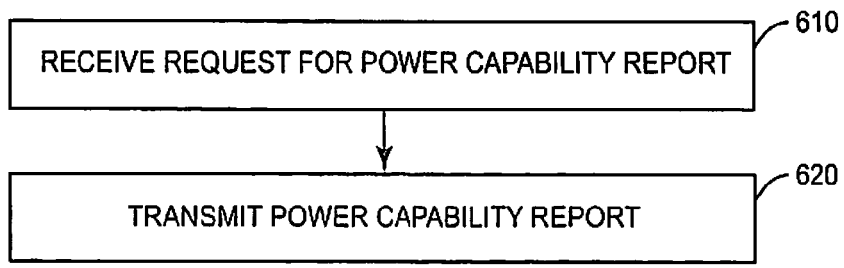
FIG. 6 is another process flow diagram illustrating a method implemented at a wireless relay node.
Figure 7:
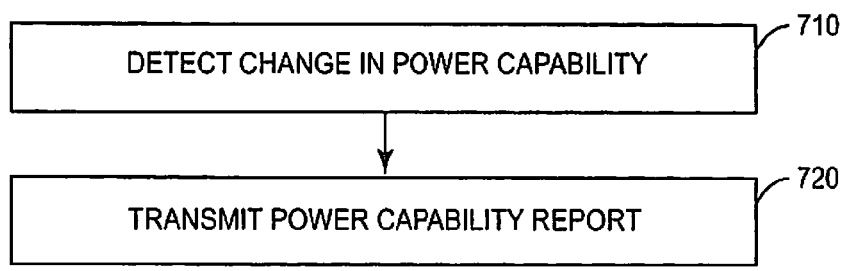
FIG. 7 is a process flow diagram illustrating another method implemented at a wireless relay node.

With the above techniques and various system configurations in mind, those skilled in the art will appreciate that FIGS. 5, 6, and 7 illustrate process flows corresponding to several of these techniques, as applied in several of the nodes described above. All of these process flow diagrams illustrate methods for managing network nodes in a wireless communication network that includes a wireless relay node for wirelessly transmitting signals to and wireless receiving signals from one or more user equipments (UEs), or to and from one or more other relay nodes, or to and from one or more of both, via an access link, and for wirelessly transmitting signals to and wirelessly receiving signals from a donor base station, via a backhaul link.

FIG. 5, for example, illustrates a process flow implemented by a donor node, such as the donor base station, or some other node "behind" the donor base station. As shown at block 510, this process optionally begins with the sending of a request for a power capability report. This is illustrated as optional because some relay nodes may be configured to report power capabilities autonomously, without an explicit request by the donor node. In systems where a request is sent, the request may specify a type of power capability to report, or specify a reporting format, or both.

Next, as shown at block 520, the node receives the power capability report from the relay node, the report indicating a first backhaul-link output-power capability and a first access-link output-power capability for the relay node. Importantly, these indicated first capabilities can comprise different values.

The reported information may be in any of a wide variety of formats, and may include various details. For example, in some cases the indicated first backhaul-link output-power capability and first access-link output-power capability are both one of the following: a power class for the relay node for the corresponding link; a maximum output power for the relay node for the corresponding link; a rated output power for the relay node for the corresponding link; and a minimum output power for the relay node for the corresponding link. In some embodiments, at least one of the indicated first backhaul-link output-power capability and first access-link output-power capability is reported as a relative value. In some of these embodiments, one of the indicated first backhaul-link output-power capability and first access-link output-power capability is reported as a relative value that indicates an offset from the other of the indicated first backhaul-link output-power capability and first access-link output-power capability. In others, both of the indicated first backhaul-link output-power capability and first access-link output-power capability are reported as relative values that indicate an offset from a corresponding pre-defined reference value.

Rather than including separate explicit values corresponding to the backhaul and access links, in some embodiments the report received from the relay node includes a scenario identifier that identifies one of a pre-determined set of combinations of access-link and backhaul-link output-power capabilities. In some embodiments, at least one of the indicated first backhaul-link output-power capability and first access-link output-power capability corresponds to a first antenna port of the relay node, and the report further indicates a second backhaul-link output-power capability or a second access-link output-power capability, or both, for a second antenna port of the relay node. Similarly, in some embodiments, at least one of the indicated first backhaul-link output-power capability and first access-link output-power capability correspond to a first component carrier in a corresponding multi-carrier link, and the report further indicates a second backhaul-link output-power capability or a second access-link output-power capability, or both, for a second component carrier of the corresponding multi-carrier link.

In some embodiments, the power capability report is received directly from the relay node (via a backhaul link), while in others the power capability report may be received via forwarding by some intermediate node, such as a donor base station or an intermediate relay node.

Finally, as shown at block 530, the power capability information received from the relay node is applied in one or more network management tasks. These network management tasks include, but are not limited to, any of the following: network resource allocation; network load balancing; admission control; determining the coverage of the relay node; determining the number of relay nodes required to cover the coverage area of the donor base station; determining a data capacity for a link; assigning antenna modes or modulation and coding schemes, or both; determining a transmission format for the backhaul link; and determining the power of a positioning reference signal. Network management tasks may also include configuring the relay maximum output power separately for the backhaul and access links, without exceeding the reported capabilities, e.g., by signaling power limits to the relay node.

FIG. 6 illustrates a process flow implemented by a relay node, whether a relay node communicating directly with a donor base station or a relay node connected to the network core through one or more intermediate relay nodes. As shown at block 610, the illustrated process begins with the receiving of a request for a power capability report. In some embodiments, the request may specify a type of power capability to report, or specify a reporting format, or both.

In response to the request, the relay node transmits the power capability report to the network, as shown at block 620. The report indicates a first backhaul-link output-power capability and a first access-link output-power capability for the relay node. Again, these indicated first capabilities can comprise different values.

As discussed in detail above, the reported information may be in any of a wide variety of formats, and may include various details. For example, in some cases the indicated first backhaul-link output-power capability and first access-link output-power capability are both one of the following: a power class for the relay node for the corresponding link; a maximum output power for the relay node for the corresponding link; a rated output power for the relay node for the corresponding link; and a minimum output power for the relay node for the corresponding link. In some embodiments, at least one of the indicated first backhaul-link output-power capability and first access-link output-power capability is reported as a relative value. In some of these embodiments, one of the indicated first backhaul-link output-power capability and first access-link output-power capability is reported as a relative value that indicates an offset from the other of the indicated first backhaul-link output-power capability and first access-link output-power capability. In others, both of the indicated first backhaul-link output-power capability and first access-link output-power capability are reported as relative values that indicate an offset from a corresponding pre-defined reference value.

Rather than including separate explicit values corresponding to the backhaul and access links, in some embodiments the report transmitted from the relay node includes a scenario identifier that identifies one of a pre-determined set of combinations of access-link and backhaul-link output-power capabilities. In some embodiments, at least one of the indicated first backhaul-link output-power capability and first access-link output-power capability corresponds to a first antenna port of the relay node, and the report further indicates a second backhaul-link output-power capability or a second access-link output-power capability, or both, for a second antenna port of the relay node. Similarly, in some embodiments, at least one of the indicated first backhaul-link output-power capability and first access-link output-power capability correspond to a first component carrier in a corresponding multi-carrier link, and the report further indicates a second backhaul-link output-power capability or a second access-link output-power capability, or both, for a second component carrier of the corresponding multi-carrier link.

In some embodiments, the power capability report is sent only from the relay node to the donor base station (via a backhaul link), while in others the power capability report may be forwarded to the target node via forwarding by some intermediate node, such as a donor base station or an intermediate relay node.

The report request illustrated at block 610 is only one of several possible events that might trigger a report. As discussed earlier, some relay nodes may be configured to report power capabilities autonomously, without an explicit request by the donor node. For example, a relay node might be configured to transmit a power capability report in response to a change in a backhaul-link output-power capability or an access-link output-power capability, or both. The same relay node or a different embodiment might be configured to transmit the report upon power-up of the relay node, or upon re-establishment of a link by the relay node, or both.

An example of this approach is shown in FIG. 7. As shown at block 710, a change in power capability is detected by the node. In response, a power capability report, reflecting this change, is transmitted to the network as shown at block 720. Aside from the difference in triggering event, the procedure in FIG. 7 is similar to the one described in connection with FIG. 6, and is subject to any of the same modifications and variants.

Figure 8:
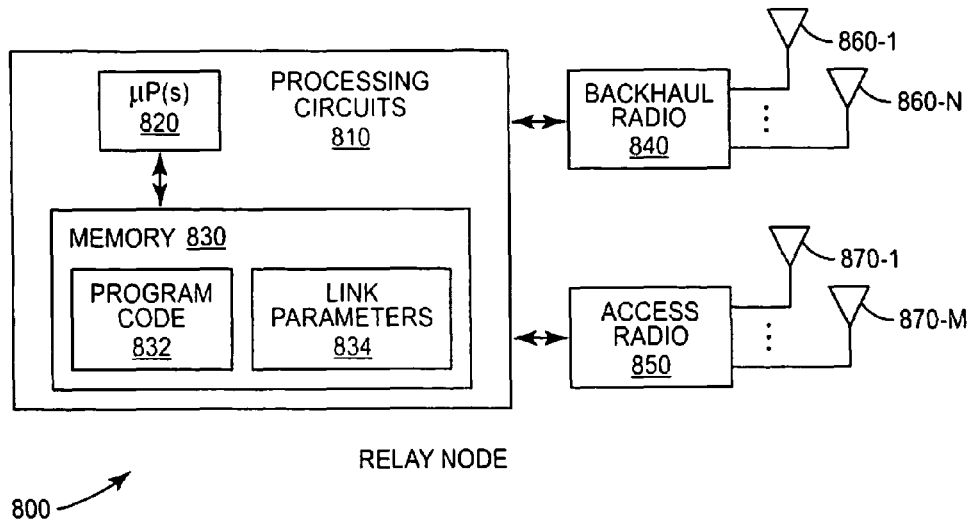
FIG. 8 is a block diagram illustrating components of an example relay node.
Figure 9:
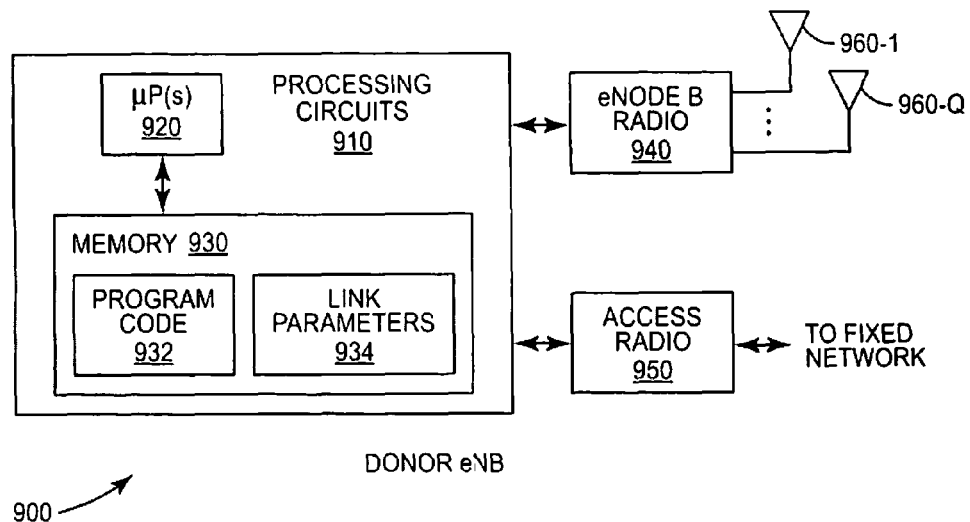
FIG. 9 is a block diagram illustrating components of an example donor base station.

FIGS. 8 and 9 illustrate elements of an example relay node and example donor eNodeB, respectively. These devices can be configured to carry out one or more of the corresponding methods described above. Thus, for example, the relay node 800 pictured in FIG. 8 includes processing circuits 810 in addition to backhaul radio 840 and access radio 850. Each of the backhaul radio 840 and access radio 850 may use one or several antennas (e.g., for MIMO operation). In the illustrated embodiment, backhaul radio 840 has N antennas, 860-1 to 860-N, while access radio 850 has M antennas, 870-1 to 870-M. In some cases one or more of these antennas may be shared by transmit and receive functions.

Processing circuits 810 comprise a microprocessor 820 and memory 830. Microprocessor 820 is configured with appropriate program code 832 for carrying out one or several of the reporting and configuration techniques described above. Note that memory 830, which may comprise several types of memory, includes storage for link parameters 834, which includes data indicating the maximum and/or minimum radio powers for the backhaul and access links.

As seen in FIG. 9, donor eNodeB 900 has a similar general configuration to that of relay node 800. However, in addition to processing circuits 910, donor eNodeB comprises an eNodeB radio 940 (for communicating with relay node 800 and with one or more UEs) and a network interface 950, which provides a link to the fixed portion of the telecommunications network, including, in some embodiments, other donor eNodeBs. As was the case with the relay node of FIG. 8, the eNodeB radio 940 may use one or several antennas (e.g., for MIMO operation). The illustrated embodiment has Q antennas, labeled 960-1 to 960-Q. Again, in some cases one or more of these antennas may be shared for transmit and receive operation.

Processing circuits 910 comprise at least one microprocessor 920 and memory 930. Microprocessor 930 is configured with appropriate program code 932 for carrying out one or several of the reporting and configuration techniques described above. Memory 930, which may comprise several types of memory, also includes storage for link parameters 934, which includes data indicating the maximum and/or minimum radio powers for the backhaul and access links of one or more relay NodeBs.

Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

The techniques and apparatus described above enable a relay node to report separate maximum and/or minimum output power capabilities to the donor BS or to other network nodes, for each of the access link and backhaul link supported by the relay node. The reported backhaul and access link power capability information can be used for various purposes, such as radio resource management, network planning/dimensioning etc. Knowing the available power in the access part of the relay can be used for determining how many users to admit to the relay. This information can be further used, for example, to determine whether users can or should be handed over from or to the donor base station from the relay node.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method for managing network nodes in a wireless communication network that includes a wireless relay node for wirelessly transmitting signals to and wirelessly receiving signals from one or more user equipments, or to and from one or more other relay nodes, or to and from one or more of both, via an access link, and for wirelessly transmitting signals to and wirelessly receiving signals from a donor base station, via a backhaul link, the method comprising, in a network node:
 receiving, from the relay node, a report indicating a first backhaul-link output-power capability and a first access-link output-power capability for the relay node, wherein the indicated first capabilities comprise different values;
 applying the indicated first capabilities in one or more network management tasks.

2. The method of claim 1 wherein both of the indicated first backhaul-link output-power capability and first access-link output-power capability are one of the following:
 a power class for the relay node for the corresponding link;
 a maximum output power for the relay node for the corresponding link;
 a rated output power for the relay node for the corresponding link;
 a minimum output power for the relay node for the corresponding link.

3. The method of claim 1 wherein at least one of the indicated first backhaul-link output-power capability and first access-link output-power capability is reported as a relative value.

4. The method of claim 3 wherein one of the indicated first backhaul-link output-power capability and first access-link output-power capability is reported as a relative value that indicates an offset from the other of the indicated first backhaul-link output-power capability and first access-link output-power capability.

5. The method of claim 3 wherein both of the indicated first backhaul-link output-power capability and first access-link output-power capability are reported as relative values that indicate an offset from a corresponding pre-defined reference value.

6. The method of claim 1 wherein the report received from the relay node comprises a scenario identifier that identifies one of a pre-determined set of combinations of access-link and backhaul-link output-power capabilities.

7. The method of claim 1:
 wherein at least one of the indicated first backhaul-link output-power capability and first access-link output-power capability corresponds to a first antenna port of the relay node;
 wherein the report received from the relay node further indicates a second backhaul-link output-power capability or a second access-link output-power capability, or both, for a second antenna port of the relay node;
 wherein the method further comprises applying the indicated second capabilities in one or more network management tasks.

8. The method of claim 1:
 wherein at least one of the indicated first backhaul-link output-power capability and first access-link output-power capability corresponds to a first component carrier in a corresponding multi-carrier link;
 wherein the report received from the relay node further indicates a second backhaul-link output-power capability or a second access-link output-power capability, or both, for a second component carrier of the corresponding multi-carrier link;
 wherein the method further comprises applying the indicated second capabilities in one or more network management tasks.

9. The method of claim 1 further comprising previously requesting the relay node to provide the report.

10. The method of claim 1 wherein applying the indicated first capabilities in one or more network management tasks comprises using the indicated first capabilities in one or more of:
- network resource allocation;
- network load balancing;
- admission control;
- determining the coverage of the relay node;
- determining the number of relay nodes required to cover the coverage area of the donor base station;
- determining a data capacity for a link;
- assigning antenna modes or modulation and coding schemes, or both;
- determining a transmission format for the backhaul link;
- determining the power of a positioning reference signal;
- configuring the relay maximum output power separately for the backhaul and access links, without exceeding the first capabilities.

11. A method for managing network nodes in a wireless communication network that includes a wireless relay node for wirelessly transmitting signals to and wirelessly receiving signals from one or more user equipments, or to and from one or more other relay nodes, or to and from one or more of both, via an access link, and for wirelessly transmitting to and wirelessly receiving signals from a donor base station, via a backhaul link, the method comprising, in the relay node:
- transmitting, over the backhaul link, a report indicating a first backhaul-link output-power capability and a first access-link output-power capability for the relay node, wherein the indicated first capabilities comprise different values.

12. The method of claim 11 wherein both of the indicated first backhaul-link output-power capability and first access-link output-power capability are one of the following:
- a power class for the relay node for the corresponding link;
- a maximum output power for the relay node for the corresponding link;
- a rated output power for the relay node for the corresponding link;
- a minimum output power for the relay node for the corresponding link.

13. The method of claim 11 wherein at least one of the indicated first backhaul-link output-power capability and first access-link output-power capability is reported as a relative value.

14. The method of claim 13 wherein one of the indicated first backhaul-link output-power capability and first access-link output-power capability is reported as a relative value that indicates an offset from the other of the indicated first backhaul-link output-power capability and first access-link output-power capability.

15. The method of claim 13 wherein both of the indicated first backhaul-link output-power capability and first access-link output-power capability are reported as relative values that indicate an offset from a corresponding pre-defined reference value.

16. The method of claim 11 wherein the report comprises a scenario identifier that identifies one of a pre-determined set of combinations of access-link and backhaul-link output-power capabilities.

17. The method of claim 11:
- wherein at least one of the indicated first backhaul-link output-power capability and first access-link output-power capability corresponds to a first antenna port of the relay node;
- wherein the report further indicates a second backhaul-link output-power capability or a second access-link output-power capability, or both, for a second antenna port of the relay node.

18. The method of claim 11:
- wherein at least one of the indicated first backhaul-link output-power capability and first access-link output-power capability corresponds to a first component carrier in a corresponding multi-carrier link;
- wherein the report received from the relay node further indicates a second backhaul-link output-power capability or a second access-link output-power capability, or both, for a second component carrier of the corresponding multi-carrier link.

19. The method of claim 11 further comprising previously receiving, from the donor base station or from a second relay node, a request to provide the report.

20. A network node for use in a wireless communication network that includes a wireless relay node for wirelessly transmitting signals to and wirelessly receiving signals from one or more user equipments, or to and from one or more other relay nodes, or to and from one or more of both, via an access link, and for wirelessly transmitting signals to and wirelessly receiving signals from a donor base station, via a backhaul link, the network node comprising
- a transceiver configured to communicate with the relay node;
- processing circuits configured to:
  - receive, from the relay node, a report indicating a first backhaul-link output-power capability and a first access-link output-power capability for the relay node, wherein the indicated first capabilities comprise different values;
  - apply the indicated first capabilities in one or more network management tasks.

21. The network node of claim 20 wherein both of the indicated first backhaul-link output-power capability and first access-link output-power capability are one of the following:
- a power class for the relay node for the corresponding link;
- a maximum output power for the relay node for the corresponding link;
- a rated output power for the relay node for the corresponding link;
- a minimum output power for the relay node for the corresponding link.

22. The network node of claim 20 wherein at least one of the indicated first backhaul-link output-power capability and first access-link output-power capability is reported as a relative value.

23. The network node of claim 22 wherein one of the indicated first backhaul-link output-power capability and first access-link output-power capability is reported as a relative value that indicates an offset from the other of the indicated first backhaul-link output-power capability and first access-link output-power capability.

24. The network node of claim 22 wherein both of the indicated first backhaul-link output-power capability and first access-link output-power capability are reported as relative values that indicate an offset from a corresponding pre-defined reference value.

25. The network node of claim 20 wherein the report received from the relay node comprises a scenario identifier that identifies one of a pre-determined set of combinations of access-link and backhaul-link output-power capabilities.

26. The network node of claim 20:
- wherein at least one of the indicated first backhaul-link output-power capability and first access-link output-power capability corresponds to a first antenna port of the relay node;
- wherein the report received from the relay node further indicates a second backhaul-link output-power capability or a second access-link output-power capability, or both, for a second antenna port of the relay node;
- wherein the processing circuits are further configured to apply the indicated second capabilities in one or more network management tasks.

27. The network node of claim 20:
- wherein at least one of the indicated first backhaul-link output-power capability and first access-link output-power capability corresponds to a first component carrier in a corresponding multi-carrier link;
- wherein the report received from the relay node further indicates a second backhaul-link output-power capability or a second access-link output-power capability, or both, for a second component carrier of the corresponding multi-carrier link;
- wherein the processing circuits are further configured to apply the indicated second capabilities in one or more network management tasks.

28. The network node of claim 20 wherein the processing circuits are further configured to request the relay node to provide the report prior to receiving the report.

29. The network node of claim 20 wherein the processing circuits are configured to apply the indicated first capabilities in one or more network management tasks by using the indicated first capabilities in one or more of:
- network resource allocation;
- network load balancing;
- admission control;
- determining the coverage of the relay node;
- determining the number of relay nodes required to cover the coverage area of the donor base station;
- determining a data capacity for a link;
- assigning antenna modes or modulation and coding schemes, or both;
- determining a transmission format for the backhaul link;
- determining the power of a positioning reference signal;
- configuring the relay maximum output power separately for the backhaul and access links, without exceeding the first capabilities.

30. A relay node for use in a wireless communication network, the relay node comprising:
- an access radio configured to wirelessly transmit signals to and wirelessly receive signals from one or more user equipments, or to and from one or more other relay nodes, or to and from one or more of both, via an access link;
- a backhaul radio configured to wirelessly transmit to and wirelessly receive signals from a donor base station, via a backhaul link;
- processing circuits configured to transmit, over the backhaul link, a report indicating a first backhaul-link output-power capability and a first access-link output-power capability for the relay node, wherein the indicated first capabilities comprise different values.

31. The relay node of claim 30 wherein both of the indicated first backhaul-link output-power capability and first access-link output-power capability are one of the following:
- a power class for the relay node for the corresponding link;
- a maximum output power for the relay node for the corresponding link;
- a rated output power for the relay node for the corresponding link;
- a minimum output power for the relay node for the corresponding link.

32. The relay node of claim 30 wherein at least one of the indicated first backhaul-link output-power capability and first access-link output-power capability is reported as a relative value.

33. The relay node of claim 32 wherein one of the indicated first backhaul-link output-power capability and first access-link output-power capability is reported as a relative value that indicates an offset from the other of the indicated first backhaul-link output-power capability and first access-link output-power capability.

34. The relay node of claim 32 wherein both of the indicated first backhaul-link output-power capability and first access-link output-power capability are reported as relative values that indicate an offset from a corresponding pre-defined reference value.

35. The relay node of claim 30 wherein the report comprises a scenario identifier that identifies one of a pre-determined set of combinations of access-link and backhaul-link output-power capabilities.

36. The relay node of claim 30:
- wherein at least one of the indicated first backhaul-link output-power capability and first access-link output-power capability corresponds to a first antenna port of the relay node;
- wherein the report further indicates a second backhaul-link output-power capability or a second access-link output-power capability, or both, for a second antenna port of the relay node.

37. The relay node of claim 30:
- wherein at least one of the indicated first backhaul-link output-power capability and first access-link output-power capability corresponds to a first component carrier in a corresponding multi-carrier link;
- wherein the report received from the relay node further indicates a second backhaul-link output-power capability or a second access-link output-power capability, or both, for a second component carrier of the corresponding multi-carrier link.

38. The relay node of claim 30 wherein the processing circuits are further configured to receive, from the donor base station or from a second relay node, a request to provide the report prior to transmitting the report.

* * * * *

UNITED STATES PATENT AND TRADEMARK OFFICE
CERTIFICATE OF CORRECTION

PATENT NO. : 8,798,525 B2  Page 1 of 1
APPLICATION NO. : 13/384702
DATED : August 5, 2014
INVENTOR(S) : Kazmi et al.

It is certified that error appears in the above-identified patent and that said Letters Patent is hereby corrected as shown below:

Specification

In Column 1, Line 40, delete "interface," and insert -- interface. --, therefor.

In Column 4, Line 40, delete "WCDMA" and insert -- WCDMA or --, therefor.

In Column 7, Line 38, delete "$P_{MIN\_BL}$." and insert -- $P_{MIN\_AL}$. --, therefor.

In Column 8, Line 15, delete "(Pmax_REF)." and insert -- (Pmin_REF). --, therefor.

In Column 8, Line 34, delete "below," and insert -- below. --, therefor.

In Column 14, Line 7, delete "mufti-" and insert -- multi- --, therefor.

In Column 17, Line 18, delete "memory 930," and insert -- memory 930. --, therefor.

In Column 17, Line 18, delete "Microprocessor 930" and insert -- Microprocessor 920 --, therefor.

Signed and Sealed this
Second Day of August, 2016

Michelle K. Lee
*Director of the United States Patent and Trademark Office*